Sept. 3, 1963  K. BEDROSIAN ET AL  3,102,780
METHOD OF PRESERVING ANIMAL AND PLANT MATERIALS
Filed Jan. 30, 1963  2 Sheets-Sheet 1

Inventors.
Karakion Bedrosian
Joshua R. C. Brown
By. Hofgren, Brady, Wegner
Allen & Stellman
Attorneys.

Sept. 3, 1963  K. BEDROSIAN ET AL  3,102,780
METHOD OF PRESERVING ANIMAL AND PLANT MATERIALS
Filed Jan. 30, 1963  2 Sheets-Sheet 2

Inventors
Karakian Bedrosian
Joshua R. C. Brown.

By Hofgren, Brady, Wegner,
Allen v Stellman

Attorneys.

3,102,780
METHOD OF PRESERVING ANIMAL AND PLANT MATERIALS
Karakian Bedrosian, St. Joseph, Mich., and Joshua R. C. Brown, Chesterton, Ind., assignors to Whirlpool Corporation, a corporation of Delaware
Filed Jan. 30, 1963, Ser. No. 258,099
6 Claims. (Cl. 21—58)

This invention relates to a method of storing perishable animal and plant materials including both food materials and non-food materials.

This is a continuation-in-part application of our copending application Serial No. 149,731, filed November 2, 1961, now abandoned.

Stored animal and plant materials immediately begin to deteriorate because of combinations of various changes taking place in these materials. In general, these changes are brought about by the following actions: physiological, such as that brought about by enzymes, naturally occurring in all plant and animal materials; microbiological, caused principally by microorganisms such as bacteria, yeasts and molds which are natural contaminants of all plant and animal materials; biochemical, which is primarily caused by oxidation resulting in such end effects as rancidity and non-enzymatic browning; and physical, exemplified by dehydration and plasmolysis.

Physiological and microbiological degradation or deterioration which are the main causes of spoilage due to such degradation or deterioration in stored animal and plant materials are both dependent on respiratory activities. During this respiratory activity oxygen is assimilated from the surrounding atmosphere and carbon dioxide and water are produced as degradation products. As to whether the major or initial degradation will be a result of physiological or microbiological activity is a function of the nature of the raw material, the level and type of contamination, the maturity of the materials, and the storage temperature. Generally speaking, plant materials degrade physiologically prior to any significant microbiological changes whereas the opposite is true for animal materials.

The physiological degradation of stored plant materials which is also known as catabolism releases energy by consuming oxygen and releasing carbon dioxide and water. The microbiological degradation which is the major cause of degradation or deterioration in stored animal materials such as fresh meat and the like is caused largely by microorganisms. These also consume oxygen and produce carbon dioxide and water as with the plant materials. The degradation or deterioration process for both animal and plant materials can therefore be expressed in the following approximate respiratory change equation:

$$nO_2 + (CH_2O)_n \rightarrow nCO_2 + nH_2O$$

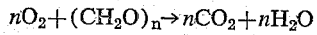

In this equation which expresses the chemical reactions involved, $(CH_2O)_n$ represents a carbohydrate molecule that is destroyed during the degradation or deterioration process as explained above with $n$ being a whole number dependent upon the size of the molecule, with the size of the molecule, of course, depending upon the number of recurring $CH_2O$ units present. The practical lower limit of $n$ is, of course, 6 and in this case the carbohydrate molecule would be that of a simple sugar. For more complex molecules $n$ could be extremely large such as 1,000,000 or more. However, in every instance one molecule of oxygen is consumed for each $CH_2O$ unit in the carbohydrate with the production of one molecule of carbon dioxide and one molecule of water. The carbohydrates are either present as such in the plant materials and microorganisms discussed above or may be produced as end products from other substances such as proteins and fats. In any event, the deterioration changes on storage of both animal and plant materials in the presence of oxygen such as the oxygen of normal air is expressed by the above chemical reaction equation.

The above formula is actually a simplified formula as the carbohydrate that is consumed ordinarily passes through a series of steps including a sugar stage, an acid stage and finally to the reaction products of carbon dioxide and water as indicated.

The method and apparatus of this invention results from the discovery that the progress of this equation can be retarded so as to slow down the aging process of stored plant and animal materials by, first, controlling the atmosphere to which the materials are subjected and, second, continually replenishing this atmosphere during the storage period. It is virtually impossible as a practical matter to stop the progress of the reaction equation for the stored materials and stopping is not desired, as otherwise the stored materials would not respirate which is necessary to maintain their fresh characteristics. However, the storage period can be greatly extended to maintain the freshly stored appearance of the materials by slowing down the rate of the reaction.

In order to retard the progress of the above equation the storage atmosphere must contain reduced oxygen and increased carbon dioxide. As oxygen is being consumed in the above reaction the amount of oxygen is maintained at an amount less than that found in ordinary air. As carbon dioxide is being generated the amount of carbor dioxide in the storage atmosphere is greater than that normally found in air. Thus, on one hand the storage condition results in "starving" the carbohydrate so that its rate of deterioration is retarded. On the other hand, the carbohydrate is "flooded" with carbon dioxide so as to retard the reaction further. Thus, both the amount of oxygen and the amount of carbon dioxide serve to retard the rate of reaction and extend the storage life.

As is evident from the above explanation, the amounts of oxygen and carbon dioxide are not important so long as enough oxygen is present to permit the respiration progress of the equation but at a slower rate of respiration. If maximum storage life is desired, this amount of oxygen is only sufficient to maintain respiration of the stored materials. If only a very slight extension of the storage period is required, the amount of oxygen can be only slightly less than that found in normal air. As is well known, ambient or normal air customarily contains about 21% oxygen and about 0.03% carbon dioxide, both by volume, with the remainder of the air being nitrogen and minor amounts of other inert gases.

It is well known that an atmosphere low in oxygen and high in carbon dioxide is contained in the flue gases resulting from the combustion of carbonaceous fuels such as hydrocarbon fuels in oxygen as from air. In fact, suitable control of air-fuel mixtures will produce exhaust containing any desired oxygen concentration from 0 to 10% with a corresponding content of carbon dioxide dependent on oxygen concentration and on the fuel. In our first attempts to use such exhaust to retard degradation of fresh food products, adverse effects on the food were observed. It was discovered that the major offender was oxides of nitrogen which normally appear in flue gases resulting from the combustion of fuels in air at normal flame temperatures.

It was then discovered that a modified combustion method will produce complete combustion without significant or measurable quantities of nitrogen oxides. This modified combustion method comprises the combustion of carbonaceous fuel in air at temperatures below the reaction temperatures at which nitrogen from air reacts with oxygen to form mixed nitrogen oxides. These temperatures are substantially below the temperature range of normal flames. Flameless combustion with pure exhaust was secured by contacting an air-fuel mixture with a catalyst bed arranged in such a manner that cooling the bed as by radiation from the catalyst limited the temperature of combustion to any desired temperature in the range from 1200° F. to 2000° F.

In the method of this invention the preserving atmosphere is produced by burning a carbonaceous, and preferably a hydrocarbon, fuel in the presence of air at a temperature less than that required to oxidize any substantial or measurable portion of the nitrogen components present in the combustion mixture to produce an atmosphere including oxygen and carbon dioxide but substantially free of nitrogen oxides which have a harmful effect on the stored materials. It is well known that in normal gas flame combustion at least 50 to 75 parts per million of oxides of nitrogen are formed. By burning catalytically and dissipating a substantial portion of the heat of combustion the maximum temperature in the combustion zone can be easily maintained below about 2000° F. at which substantially no nitrogen oxides are formed.

Although thermochemical calculations would indicate that at equilibrium conditions at temperatures below about 2000° F. substantial quantities of oxides of nitrogen would be present, this reduced temperature as well as other factors inherently present in such burning causes the products of combustion to have no measurable amounts of oxides of nitrogen. Currently available equipment would be effective to measure the quantity of the oxides of nitrogen present if the concentration were as much as one part per million and not even this small amount was measured.

The resulting atmosphere is modified, if necessary, to attain the proper predetermined volumetric portions of oxygen and carbon dioxide in consideration of the material being stored or conditioned and is regulated where necessary to the desired temperature. It will be noted that since one of the principal products of combustion of hydrocarbon fuels is water vapor, the atmosphere as supplied to the storage area also has the benefit of being saturated which is of benefit, for example, in storing such food materials as apples, cherries, green beans, and particularly meat products. With respect to meats the loss through dehydration normally exceeds that caused by the physiological and microbiological degradation. When storing a product such as onions which requires a lower humidity the atmosphere may be subcooled and reheated to obtain the desired humidity conditions.

One of the features of this invention therefore is to provide an improved method of storing perishable animal and plant materials in which an atmosphere suitable for the storing is produced by controlled low temperature combustion of a carbonaceous fuel in the presence of excess oxygen, preferably from air.

Other features and advantages of the invention will be apparent from the following description of certain embodiments thereof in conjunction with the accompanying drawings.

Figure 1:
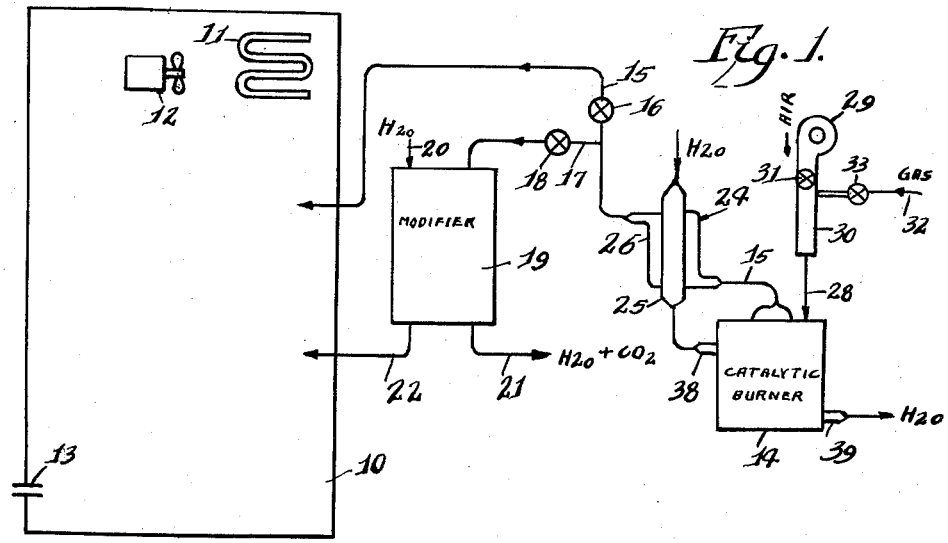
FIGURE 1 is a diagrammatic representation of a storage system embodying the invention.

The chamber of the illustrated apparatus embodiment in which the material such as food is adapted to be stored is indicated diagrammatically at 10 in FIGURE 1 and the interior of this chamber is cooled by the refrigerant evaporator 11 of a conventional refrigeration system. Storage atmosphere within the chamber 10 is circulated through the chamber and over the evaporator for cooling by a motor driven fan illustrated diagrammatically at 12. It is necessary that the chamber 10 have an outlet so that as the gases making up the preserving atmosphere flow into the chamber some of the gases will escape in order that the atmosphere will be continually replenished. Such escape in an actual embodiment such as a conventional cold storage chamber may be accomplished around doors and other openings and structural irregularities and such leakage means are illustrated as an escape vent indicated diagrammatically at 13 in FIGURE 1.

In order to generate the preserving atmosphere at a relatively low temperature where production of nitrogen oxides is substantially prevented, there is provided a catalytic burner 14 having a first outlet conduit 15 for the products of combustion. The conduit is provided with a valve 16 by means of which the conduit is opened or closed.

Also leading from the catalytic burner as a branch from pipe 15 is a second conduit 17 for the products of combustion. This conduit 17 is likewise provided with a valve 18 and leads into a modifier 19 which is a scrubbing tower of conventional construction for removing any desired amounts of carbon dioxide from the gaseous products of combustion if such removal is required. As is customary in such modifier towers there is provided a water inlet line 20 and an outlet line 21 for water containing dissolved carbon dioxide. If desired, the carbon dioxide may be removed at a point downstream in the customary manner so that the water can be reused or used for other purposes. The modifier tower 19 is provided with a gas outlet 22 also leading into the interior of the chamber 10.

To provide for cooling of the hot products of combustion in conduit 15, heat exchanger 24 may be placed in outlet conduit 15. Heat exchanger 24 comprises an inner water conduit 25 and outer jacket 26 for the products of combustion. There, of course, may be the conventional fins or other means to augment heat transfer from the water in conduit 25 to the gases in jacket 26.

Figure 2:
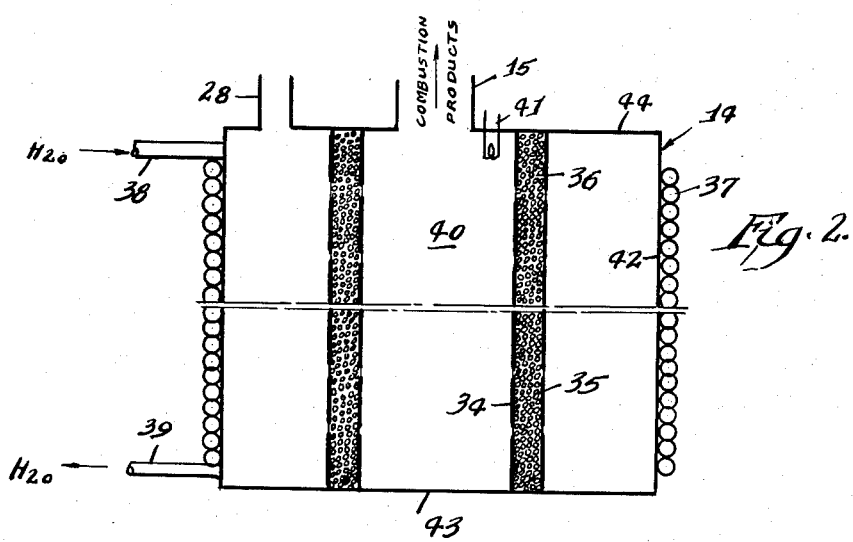
FIGURE 2 is a diagrammatic vertical section view through the catalytic burner of the apparatus of FIGURE 1.
Figure 3:
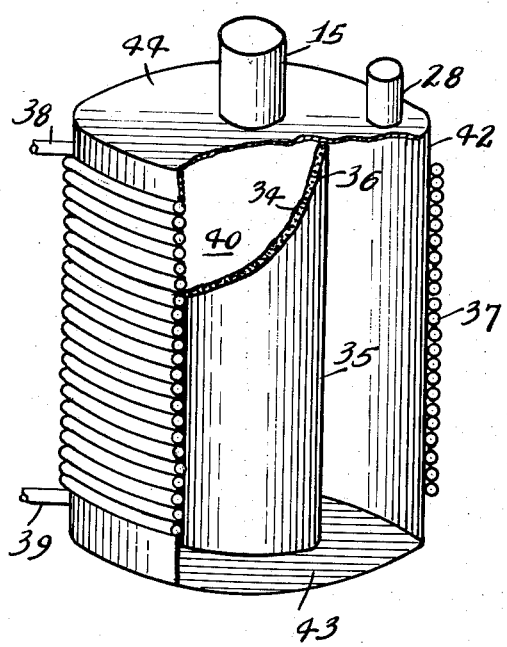
FIGURE 3 is an isometric view of the catalytic burner of the apparatus partially broken away to show interior details.
Figure 4:
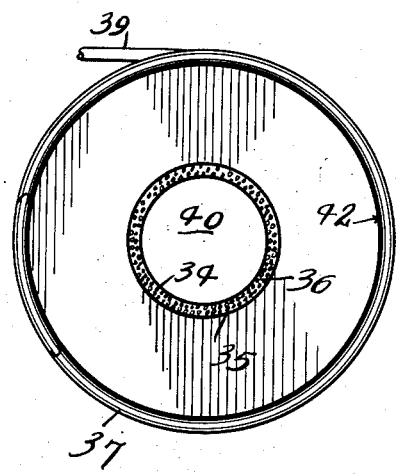
FIGURE 4 is a horizontal cross-sectional view of the burner of FIGURE 2.

The detailed construction of the catalytic burner 14 is illustrated in FIGURES 2-4. This burner is of cylindrical shape and is provided with an inlet 28 for mixed fuel gases such as natural gas and air that are preferably premixed in the customary manner in the proportions to give a desired ratio to the fuel gas and the air. The air is preferably in about 20–25% excess over that required for complete combustion of the fuel.

As shown in FIGURE 1, air may be supplied from blower 29 to mixing chamber 30 with valve 31 for controlling the amount of air. Fuel enters from line 32 into the mixing chamber 30 with valve 33 used for controlling the gas flow. The burner 14 is also provided with the outlet 15 for the gaseous products of combustion which, as explained above and as shown in FIGURE 1, may be either conducted directly into the chamber 10 by opening valve 16 and closing valve 18 or may be passed through the modifier tower 19 by closing valve 16 and opening valve 18 in order that any desired amount of carbon dioxide may be removed.

The catalytic burner 14 contains a pair of spaced concentric cylindrical perforated plates 34 and 35 that are concentric with the outlet 15 and that are adapted to contain between them the catalytic bed 36. The burner 14 which is made of metal such as steel is water cooled on the exterior as by wrapping a cooling water conduit 37 therearound with the conduit having an inlet 38 and an outlet 39. As shown in FIGURE 1, water leaving conduit 25 of heat exchanger 24 may be directly connected to inlet 38 of cooling water conduit 37. Plates 34 and 35 are secured to bottom cover 43 and top cover 44, in which inlet 28 and outlet 15 are located.

The relative amounts of air and fuel gas (which may be a vaporized liquid fuel) are regulated so as to give a desired percentage of oxygen such as 1–10% in the products of combustion flowing from the outlet 15. The air and gas mixture entering the inlet 28 flows through the bed 36 into the space 40 within the perforated cylindrical plate 34 and is ignited by customary igniter 41 which is electrically operated only long enough to secure ignition. Ignition at first takes place within the space 40 and this heats the catalytic bed 36 to a temperature high enough to support combustion. When this occurs the combustion zone then moves from the space 40 into the bed 36 where substantially all of the combustion then takes place. Although catalytic combustion is naturally at a lower temperature than ordinary combustion, this temperature is lowered still more by removing heat radiated to the side walls 42 of the burner by the cooling water passing through the helical coils 37. As a result the combustion temperature within the catalytic bed 36 is maintained at such a low value that nitrogen in the combustion mixture does not form substantial amounts of nitrogen oxides. As a result the gases flowing from the outlet 15 are substantially free of nitrogen oxides which have a very bad effect on stored food.

The catalysts of the bed 36 are well known and are commercially available, being supplied primarily to the petroleum industry for hydrocarbon modification. Typical catalysts successfully used include chrome-alumina and platinum-alumina.

In a typical catalytic burner the cylindrical shell 42 is 24 inches tall and 12 inches in diameter with the outlet 15 two inches in diameter. The perforated cylindrical plates 34 and 35 are of stainless steel with the inner cylindrical plate 34 being 8½ inches in diameter and the outer plate 35 being 10 inches in diameter so that the catalytic bed 36 is approximately three-quarters of an inch thick. The plates 34 and 35 are sealed to the corresponding ends 43 and 44 of the burner 14 in order that all of the air and gas mixture must pass through the catalytic bed. The catalyst used is a chrome-alumina catalyst of the customary type containing 20% chromic oxide in the form of ⅛ inch extruded pellets. Air is supplied by the blower 29 and adequately mixed with gas, supplied through conduit 32, by turbulent flow in the conduit 30 which leads to the burner 14. The amount of gas supplied is regulated by the valve 33 according to the capacity and the desired maximum operating temperature of the burner. The valve 31 is used to regulate the amount of air in the air-fuel mixture in order to attain the desired oxygen content in the products of combustion.

In practice, it was found most desirable to operate the burner at about 1600° F. This value was selected as being well above the approximate 1200° F. required for assurance of substantially complete combustion of the fuel and although any temperature to about 2000° F. will produce the desired atmosphere it was desirable to operate at a more moderate temperature to extend the useful life of the catalyst 36 and the perforated supporting plates 34 and 35. It is also desirable to operate the burner so that ignition of the combustible mixture does not occur prior to its penetration into the catalyst bed 36. This may be accomplished by adjustment of the gas input per unit area of the surface of catalyst 36 adjacent perforated plate 35, so the catalyst temperature at that surface is insufficient to initiate ignition and propagation of the flame back into fuel-air inlet tube 28.

As pointed out above, initially the ignition takes place within the space 40 and immediately the mixture burns with a blue flame adjacent the surface of the inner perforate cylinder 34. This heats the catalytic bed 36 very rapidly and as soon as the catalytic reaction temperature is reached, which is about 800° F. for natural gas, the combustion zone moves into the catalytic bed 36. The temperature within the bed rises rapidly and heat then begins to radiate to the outer walls 42 with the temperature continuing to rise until the radiation to the wall 42 and heat losses to the ends 43 and 44 equals the heat of combustion minus the heat content of the exhaust gases leaving the outlet 15.

The use of a catalytic bed to generate the preserving atmosphere results in an atmosphere of exceptionally high purity with no detectable oxides of nitrogen which would harm the stored food and the like. In an ordinary burner burning the same proportions of gas to air the customary level of nitrogen oxides is at least about 50 p.p.m. In the typical illustrated installation the gas-air mixture which is 40 cubic feet per hour of natural gas to 440 cubic feet per hour of air flowing in through the conduit 28 is sufficient to produce exhaust gases flowing from the outlet 15 at the rate of about 400 cubic feet per hour and at a temperature of about 1400° F. These conditions are sufficient to produce an exhaust gas containing about 2.5% oxygen and about 10.5% carbon dioxide.

When certain materials are stored in the chamber, this atmosphere is lead directly into the chamber as by means of the conduit 15 which by-passes the modifier 19. In storing certain other types of food it is often necessary to reduce the carbon dioxide content below that naturally occurring in the products of combustion. When this is done the valve 16 is closed and the valve 18 is opened so that the combustion products pass through the conduit 17 into the modifier tower 19. In the tower the gases are scrubbed with water in the customary manner to achieve any desired lesser carbon dioxide content. Such an atmosphere after having some of the carbon dioxide removed in the modifier tower 19 is then passed by way of the conduit 22 into the interior of the chamber 10.

Although the illustrative embodiment shows refrigeration, the stored materials may be maintained at a temperature that is either ambient or below or above ambient depending on many factors such as the length of the storage time, the type and source of materials being stored and the nature of the material itself. A practical but not excluding limit of temperatures is about 29–120° F. Maintenance of the storage temperature may in certain instances require heating means in order to maintain even the minimum temperature if the surrounding ambient temperature should be too low. For storing plant and animal materials such as fresh foods, a storage temperature of about 29–55° F. is preferred.

In the preferred method of practicing the invention the combustion conditions are so controlled that the amount of oxygen in the atmosphere produced is maintained between approximately 1% and 10% by volume of the atmosphere and the amount of carbon dioxide is maintained from approximately 0.5 to 6 times the amount by volume of the oxygen with the remainder of the atmosphere being a gas such as nitrogen from the air supply that is inert to the stored materials and which therefore has no measurable chemical effect on the materials. In most instances, the amount of carbon dioxide is preferably between about 1% and 15% by volume when the amount of oxygen is between about 1% and 10% by volume. For example, an atmosphere that has been found to be effective for most storage under the conditions of this invention is one containing 4% oxygen, 10% carbon dioxide and 86% nitrogen. Some materials such as certain fruits may be better stored in an atmosphere containing 3% oxygen, 2% carbon dioxide and 95% inert gases, while other fruits may require for best results a storage atmosphere of 1% oxygen, 5% carbon dioxide and 95% inert gases. Of course, it is most important that the atmosphere, regardless of its actual gas content, is vented from the storage space during the time the preserving atmosphere is being supplied, so that the incoming atmosphere substantially continually replenishes the atmosphere within the space and so that the atmosphere is not static.

The continual replenishing of the atmosphere within the storage space is necessary in order to remove respiration products as well as other products of aging. We have discovered that if these products resulting from the storage in the atmosphere of this invention are not removed damage to the stored materials frequently occurs. Furthermore, by subjecting the stored materials to optimum conditions which include the continual replenishing of the storage atmosphere the appearance and quality of the stored materials may be maintained at desirable levels throughout the storage period. This continual replenishing may be achieved as indicated in the specific embodiment by venting the atmosphere from the storage chamber as fresh atmosphere is introduced.

Most animal and plant materials will be stored at 85–100% relative humidity. With some materials such as onions, grains and nuts the humidity may be lower such as that of ambient conditions. Thus the relative humidity may be as low as 25% or lower and as high as 100%.

Under storage conditions as explained herein and where the storage, for example, is in a refrigerator, the concentration of oxygen and carbon dioxide within the refrigerator would of course vary from time to time as the refrigerator door is opened and closed to insert and remove foods. In the normal household, tests have shown that the door is opened approximately 88 times during each 24 hour period. Each time the door is opened the percentage of oxygen increases as more oxygen is admitted from the ambient atmosphere while the amount of carbon dioxide decreases due to the escape of a portion of the storage atmosphere. However, these changes within the refrigerator apparently have no measurable effect on the storage life of animal and plant materials within the refrigerator when compared to a test condition when the door has remained closed for the entire storage life.

By using the principles of this invention it has been found that many foods, for example, may be stored in a household refrigerator which is in constant use for four weeks and longer without serious degradation. In fact, berries such as strawberries and raspberries and the like have been stored for the full four weeks term at 34° F. in an atmosphere initially of 4% oxygen, 10% carbon dioxide and 86% nitrogen in which the door was opened 88 times per 24 hour period without excessive loss of color, texture and taste in the berries.

Examples of animal and plant materials that may be stored for long periods of time under the conditions of this invention are non-food materials such as cut flowers, tobacco, flower bulbs and the like and foods such as apples, berries, peaches, pears, milk products including milk, butter and cheese, onions, celery, carrots, tomatoes, oranges, meat and meat products, eggs, potatoes, bananas, grapes, asparagus, beans, grains, nuts, peas and the like.

Having described our invention as related to the embodiments set out herein, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. The method of storing perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: burning a carbonaceous fuel in the presence of air in amounts necessary to support substantially complete combustion of said fuel and provide an atmosphere containing oxygen and carbon dioxide, said burning being at a combustion temperature that is beneath the temperature of reaction of oxygen with the nitrogen of said air to prevent formation of substantial quantities of oxides of nitrogen in said atmosphere; subjecting said materials to contact with said atmosphere for a storage period, the amount of oxygen in said atmosphere being less than said normal air quantity to retard but not prevent the progress of said equation, and the amount of carbon dioxide in said atmosphere being greater than said normal air quantity to retard but not prevent the progress of said equation; and substantially continually replenishing said atmosphere in contact with said materials during said period.

2. The method of claim 1 wherein said amount of oxygen is about 1–10% by volume of said atmosphere and the amount of carbon dioxide is about 0.5–6 times the amount by volume of said oxygen.

3. The method of claim 1 wherein said amount of oxygen is about 1–10% by volume of said atmosphere and the amount of carbon dioxide is about 1–15% by volume of said atmosphere with the remainder of said atmosphere being inert gas.

4. The method of claim 1 wherein said combustion temperature is not substantially greater than about 2000° F.

5. The method of storing perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: burning a carbonaceous fuel in the presence of air in amounts necessary to support substantially complete combustion of said fuel and provide an atmosphere containing oxygen and carbon dioxide, said burning being at a combustion temperature that is beneath the temperature of reaction of oxygen with the nitrogen of said air to prevent formation of substantial quantities of oxides of nitrogen in said atmosphere; subjecting said materials to contact with said atmosphere at a relative humidity of about 25–100% for a storage period while subjecting said materials to a temperature of about 29–120° F.; and substantially continually replenishing said temperature in contact with said materials during said period, said oxygen being about 1–10% by volume of said atmosphere in contact with said materials during about 0.5–6 times the amount by volume of said oxygen.

6. The method of claim 5 wherein said relative humidity is about 85–100% and said temperature is about 29–55° F.

References Cited in the file of this patent

UNITED STATES PATENTS

| | | |
|---|---|---|
| 1,259,410 | Kapadia | Mar. 12, 1918 |
| 2,309,007 | Parsons | Jan. 19, 1943 |
| 2,389,267 | Matthei | Nov. 20, 1945 |
| 2,483,064 | Reich | Sept. 27, 1949 |
| 2,923,629 | Bonomi | Feb. 2, 1960 |
| 2,955,940 | Williams | Oct. 11, 1960 |